Jan. 8, 1952 L. B. MITCHELL 2,581,689

PARTY LINE IDENTIFICATION DIAL

Filed April 10, 1950 3 Sheets-Sheet 1

INVENTOR.
LEN B. MITCHELL

BY Chas. Mc. Candy

ATTORNEY

INVENTOR.
LEN B. MITCHELL
BY
[signature]
ATTORNEY

Jan. 8, 1952 L. B. MITCHELL 2,581,689

PARTY LINE IDENTIFICATION DIAL

Filed April 10, 1950 3 Sheets-Sheet 3

INVENTOR.
LEN B. MITCHELL

BY [signature]

ATTORNEY

Patented Jan. 8, 1952 2,581,689

UNITED STATES PATENT OFFICE 2,581,689

PARTY LINE IDENTIFICATION DIAL

Len B. Mitchell, Wheaton, Ill., assignor to Automatic Electric Laboratories, Inc., Chicago, Ill., a corporation of Delaware Application April 10, 1950, Serial No. 155,093

4 Claims. (Cl. 179—90)

The present invention relates to telephone systems and more particularly to improved calling devices which are adapted for identifying calling stations on party lines in automatic telephone systems of the measured service type.

The improved calling device is adapted to be used in a measured service system of the type disclosed in Ostline Patent 2,366,647, which issued January 2, 1945.

In the arrangement disclosed in said Patent 2,366,647, a telephone dial has two impulse senders, the first of which serves as a means for sending digit pulses to select a called party and the second of which serves as a means for sending pulses to identify a calling party on a party line. In this system it is necessary that the two impulse senders be synchronized. This necessitates a very critical adjustment of the moving parts which it was found difficult to maintain under normal operating conditions.

Accordingly, it is an object of this invention to provide in a measured service telephone system an improved arrangement for identifying the particular calling station on a party line.

A further object of the invention is to provide an improved calling device which is of simple and compact construction and which is difficult to get out of adjustment under normal operating conditions.

A further object of the invention is to provide an improved calling device in which two impulse senders are always maintained in proper synchronization.

These and other objects are accomplished in accordance with this invention by mechanically relating the operation of one impulse sender to the operation of another impulse sender.

Figure 1:
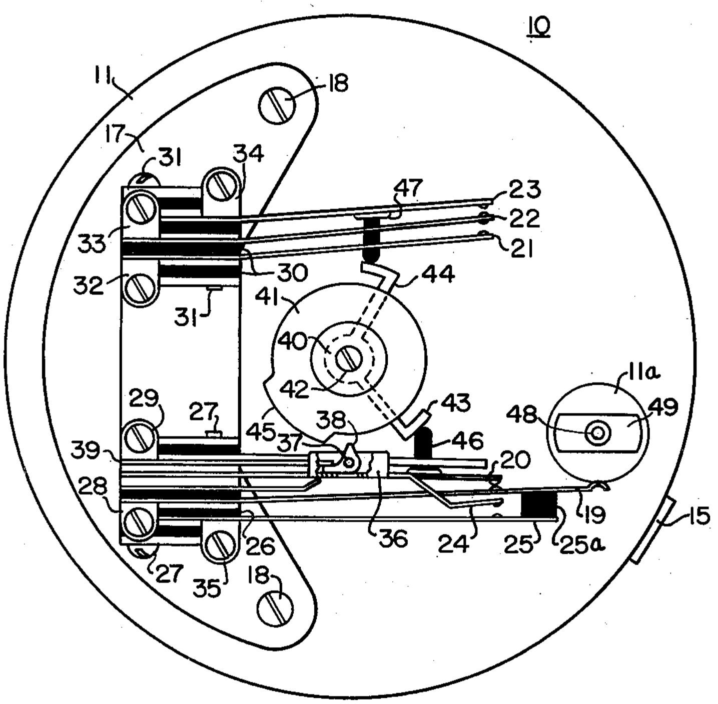
Figure 2:
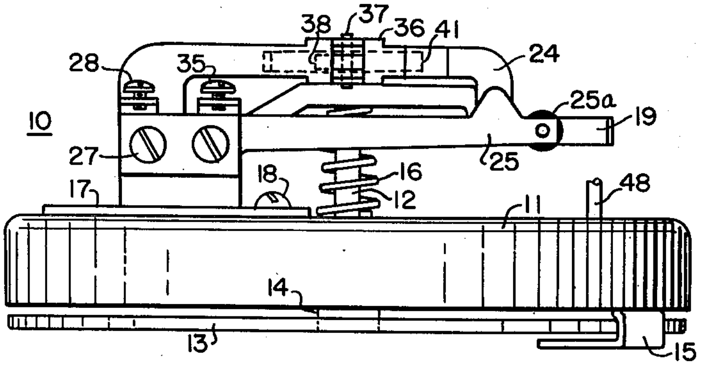

The novel features believed to be characteristic of the invention are set forth with particularity in the appended claims. The invention, both as to its organization and method of operation, together with further objects and advantages thereof, will best be understood by reference to the following specification taken in connection with the accompanying drawings, in which Fig. 1 is a rear view of a calling device embodying the present invention; Fig. 2 is a side elevational view of the calling device shown in Fig. 1; and Figs. 3 and 4 taken together illustrate diagrammatically a telephone system embodying the present invention.

Referring now more particularly to Figs. 1 and 2 of the drawings, there is shown a calling device 10 of the finger dial type and of the general construction and arrangement of that disclosed in U. S. Patent No. 1,642,822, Herbert F. Obergfell, granted September 20, 1927, which has been modified to embody the present invention.

More particularly, the calling device 10 comprises a casing 11, a rotatable arbor 12, a finger wheel or dial 13 secured to an enlarged boss 14 provided on the outer end of the arbor 12, and a cooperating finger stop 15. The finger wheel 13 has ten spaced-apart openings therein, not shown, which are adapted to receive the finger of the user and which respectively correspond to the digits 1 to 0, inclusive. Also, a coil spring 16 is provided in surrounding relation with respect to the arbor 12, the inner end of the coil spring being secured to the casing 11 and the outer end thereof being secured to the outer end of the arbor 12. The rear wall of the casing 11 carries a bracket 17, the bracket being secured in place by two spaced-apart screws 18. The bracket 17 carries a set of impulse springs 19 and 20, a set of shunt springs 21, 22 and 23, and a set of cam springs 24 and 25.

In order for the identification pulses to operate properly the cam springs 24 and 25 must make contact a moment after the impulse springs 19 and 20 and must break contact a moment before. In order to insure that the cam springs 24 and 25 are properly timed with respect to the impulse springs 19 and 20 their operation is made to depend upon a spacer 25*a* between the impulse spring 19 and cam spring 25. When the impulse spring 19 is actuated the spacer 25*a* moves the cam spring 25 in unison therewith in a manner to be more fully explained hereinafter.

The inner ends of the impulse springs 19 and 20 are suitably insulated from each other and from the bracket 17 by a plurality of strips of insulating material 26 and are retained in clamped position by two screws 27. Also, the impulse springs 19 and 20 are respectively provided with electrical terminals 28 and 29. Similarly, the inner ends of the shunt springs 21, 22 and 23 are suitably insulated from each other and from the bracket 17 by a plurality of strips of insulating material 30 and are retained in clamped position by two screws 31. Also, the shunt springs 21, 22 and 23 are respectively provided with electrical terminals 32, 33 and 34. Finally, the inner ends of the cam springs 24 and 25 are suitably insulated from each other and from the bracket 17 by certain of the strips of insulating material 26 and are retained in clamped position by the two screws 27. The electrical terminal 33 is common to the shunt spring 22 and the cam spring 24; while the cam spring 25 is provided with an electrical terminal 35. The peripheral edge of the cam 41 has a projection 45 which is of varying length depending upon the identity of the subscriber. The impulse spring 20 carries an insulating control member 46 which cooperates with the control arm 43; and the shunt spring 23 carries an insulating control member 47 which cooperates with the control arm 44.

Further, the calling device 10 comprises mechanism, not shown, housed in the casing 11, which includes a gear train and a connected impulse spindle 48 extending through an opening 11*a* provided in the rear wall of the casing 11. The outer end of the impulse spindle 48 carries an impulse cam 49 which cooperates with the extreme outer end of the impulse spring 19.

When the finger dial 13 occupies its normal position the arbor 12 is biased in a clockwise direction, as viewed in Fig. 1, by the coil spring 16; whereby the control arm 43 carried by the fixture 40 engages the control member 46 in order to urge the impulse springs 19 and 20 into engagement, and the control arm 44 carried by the fixture 40 engages the control member 47 in order to urge the shunt springs 21, 22 and 23 into disengagement. At this point it is noted that the shunt spring 23 is normally biased toward the shunt spring 22 due to its own resiliency. Also, the projection 45 carried by the cam 41 is disposed forwardly in a clockwise direction with respect to the outer end of the pawl 38; and the pawl 38 is biased in a counterclockwise direction about the pivot pin 37 by the leaf spring 39.

In order to operate the calling device 10, the user inserts his finger into one of the holes provided in the finger wheel 13 corresponding to the digit to be transmitted and rotates the finger wheel 13 in a counterclockwise direction, as viewed in Fig. 1, until his finger engages the finger stop 15 and then releases the finger wheel 13. When the finger wheel 13 and the arbor 12 secured thereto are rotated in a counterclockwise direction, the coil spring 16 is wound and the mechanism housed in the casing 11 is set to transmit the digit thus registered. More particularly, when the arbor 12 is rotated in a counterclockwise direction the control arm 43 carried by the fixture 40 disengages the control member 46, thereby to allow the impulse springs 19 and 20 to move, while maintaining engagement therebetween, toward and into cooperating relationship with respect to the impulse cam 49; however, the impulse spindle 48 and the impulse cam 49 carried thereby are not rotated prior to the release of the finger wheel 13. Also, when the arbor 12 is rotated in the counterclockwise direction the control arm 44 carried by the fixture 40 disengages the control member 47, whereby the shunt spring 23 is moved into engagement with the shunt spring 22 and forces the shunt spring 22 into engagement with the shunt spring 21 due to the inherent resiliency of the shunt spring 23, as previously noted. Finally, as the arbor 12 is rotated in the counterclockwise direction, the projection 45 carried on the periphery of the cam 41 rides over the outer end of the pawl 38 and therebehind. More specifically, when the projection 45 carried by the periphery of the cam 41 engages the outer end of the pawl 38, the pawl 38 is pivoted about the pivot pin 37 in a clockwise direction, as viewed in Fig. 1, against the bias of the leaf spring 39; however, the cam spring 24 is not moved into engagement with the cam spring 25 due to this action of the pawl 38. When the projection 45 carried on the periphery of the cam 41 rides over the outer end of the pawl 38 and therebehind, the leaf spring 39 pivots the pawl 38 in the counterclockwise direction about the pivot pin 37 back into its normal position, without moving the cam spring 24 into engagement with the cam spring 25.

At this time, when the finger wheel 13 is released it is returned in the clockwise direction as viewed in Fig. 1, by the coil spring 16 back into its normal position, whereupon the mechanism housed in the casing 11 rotates the impulse spindle 48 an appropriate amount corresponding to the digit registered. At this time, the outer end of the impulse spring 19 is arranged in cooperating relationship with respect to the impulse cam 49 due to the disengagement between the control arm 43 carried by the fixture 40 and the control member 46 carried by the impulse spring 20; accordingly, each time an end of the cam 49 engages the outer end of the impulse spring 19 the impulse spring 19 is moved out of engagement with the impulse spring 20. Hence, the opposite ends of the impulse cam 49 alternately engage and disengage the outer end of the impulse spring 19, thereby alternately to move the impulse spring 19 into disengagement and to permit it to be returned into engagement with the impulse spring 20, whereby the calling device 10 transmits a number of impulses by way of the impulse springs 19 and 20 corresponding to the digit registered.

Also, when the finger wheel 13 is released the cam 41 carried on the outer end of the arbor 12 is rotated in a clockwise direction, as viewed in Fig. 1, whereby the projection 45 carried on the periphery of the cam 41 engages the outer end of the pawl 38. More particularly, when the projection 45 carried on the periphery of the cam 41 engages the rear surface of the outer end of the pawl 38 the pawl 38 is urged in a counterclockwise direction about the pivot pin 37, as viewed in Fig. 1; however, movement of the pawl 38 in the counterclockwise direction about the pivot pin 37 is blocked due to the arrangement of the pivotal mounting of the pawl 38 upon the cam spring 24. Accordingly, at this time the pawl 38 is forced outwardly and downwardly away from the engaged projection 45 carried on the periphery of the cam 41 in order to force the cam spring 24 into engagement with the cam spring 25. Subsequently, when the projection 45 carried on the periphery of the cam 41 rides over the outer ends of the pawl 38, the pawl 38 and the cam spring 24 are returned to their normal position due to the inherent resiliency of the cam spring 24, whereby the cam spring 24 is moved into disengagement with the cam spring 25. Accordingly, as the arbor 12 is rotated in the clockwise direction back into its normal position the projection 45 on the periphery of the cam 41 causes the cam springs 24 and 25 to operate into engagement and disengagement a like number of times, whereby the calling device 10 transmits a number of impulses by way of the cam springs 24 and 25 corresponding to the length of the projection 45 provided on the periphery of the cam 41.

The cam spring 24 is adjusted so that it makes contact with impulse spring 25 only when projection 45 engages cam 38 and cam spring 19 engages cam 49. By a close adjustment of cam spring 24 it is possible to have the impulse springs 24 and 25 break just an instant before impulse springs 19 and 20 as the cam 49 rotates. This operation may be followed by reference to Fig. 1. The windup of the finger wheel 13 will rotate the cam 41 in a counterclockwise direction. During this operation the pawl 38 will rotate as the projection 45 passes over it and the impulse springs 24 and 25 wil remain stationary.

On the return of the finger wheel 13 the cams 41 and 49 will both rotate. The cam spring 19 will be given a back and forth motion by alternate engagement and disengagement with the cam 49. Prior to the time that projection 45 engages pawl 38 this action will alternately make and break impulse springs 19 and 20. The presence of the spacer 25*a*, which may be fastened either to spring 19 or spring 25, results in a back and forth motion being imparted to impulse spring 25 but no contact is made between impulse springs 24 and 25 until the projection 45 engages the pawl 38.

As soon as the projection 45 engages the pawl 38 the cam spring 24 is advanced toward the impulse spring 25. The continued rotation of the cam 49 then effects contact between the impulse springs 24 and 25 during instants that the cam 49 does not engage the cam spring 19. As soon as the cam 49 engages the cam spring 19 contact beween impulse springs 24 and 25 is broken.

The apparatus is so adjusted that with the projection 45 in engagement with the pawl 38 the distance between impulse springs 24 and 25 is slightly greater than the distance between impulse springs 19 and 20. This insures that contact between the impulse springs 19 and 20 will be made a short time interval before contact is made between the impulse springs 24 and 25. It also insures that contact between the impulse springs 24 and 25 will be broken a short time interval before contact is broken between the impulse springs 19 and 20. The total number of contacts made between the impulse springs 24 and 25 may be increased by increasing the peripheral length of the projection 45. On a four-party line the individual parties may be identified either by omitting the projection 45 or else having it of sufficient length to close the impulse springs one, two, or three times during the return travel of the finger wheel 13.

Just prior to the time the arbor 12 is rotated in the clockwise direction completely back into its normal position, the control arm 43 carried by the fixture 40 engages the control member 46 carried by the impulse spring 20 and forces the impulse spring 20 away from the impulse cam 49, whereby the outer end of the impulse spring 19 is forced out of cooperating relationship with respect to the impulse cam 49 in order to prevent any further operation of the impulse cam 49 from operating the impulse spring 19. Ultimately, when the arbor 12 is rotated in the clockwise direction into its final normal position, the control arm 44 carried by the fixture 40 engages the control member 47 carried by the shunt spring 23; whereby the shunt spring 23 is forced out of engagement with the shunt spring 22 and the shunt spring 22 is forced out of engagement with the shunt spring 21, due to its inherent resiliency. Also, when the arbor 12 has been rotated in the clockwise direction to its final normal position, the projection 45 carried on the periphery of the cam 41 has operated the associated pawl 38, in the manner explained above.

At this point, it is noted that the arrangement of the control arm 43 carried by the fixture 40 and the control member 46 carried by the impulse spring 20 is so coordinated with respect to the mechanism housed in the casing 11 that all of the digits registered in the mechanism have been transmitted by way of the impulse springs 19 and 20 a slight time interval prior to the final return of the finger wheel 13 and the connected arbor 12 into their normal positions. Also, it is noted that the shunt springs 21, 22 and 23 are moved into disengagement only upon the final return of the finger wheel 13 and the connected arbor 12 into their normal positions; while the projection 45 provided on the periphery of the cam 41 operates the associated pawl 38 just prior to the final return of the finger wheel 13 and the connected arbor 12 into their normal positions. The cooperation between the elements mentioned positively insures that the shunt springs 21, 22 and 23 are operated into engagement at all times when the finger wheel 13 is away from its normal position; while the finger wheel 13 must be moved a predetermined distance from its normal position in order to cause the first digit 1 to be effectively registered in the mechanism housed in the casing 11. Also, the cooperation between the elements mentioned above permits control of the cam springs 24 and 25 to send one impulse in excess of the number of impulses in the digit registered in the mechanism housed in the casing 11 when the digits 1 and 2 are registered therein. By way of illustration, it is pointed out that, in the present embodiment of the calling device 10, when the digit 2 is registered in the mechanism housed in the casing 11, in order to cause the impulse springs 19 and 20 to be controlled to transmit two impulses, the cam springs 24 and 25 are controlled to transmit three impulses, projection 45 being provided on the periphery of the cam 41 with sufficient peripheral length to accomplish this. Further, it will be understood that the length of projection 45 may be varied as previously explained in order to obtain selective control of the associated switching apparatus; however, in the present embodiment it is contemplated that the cam 41 will have no projection 45 thereon or will have a projection of sufficient peripheral length to close the impulse springs 24 and 25 one, two, or three times, thereby rendering the calling device 10 capable of four modifications, in an obvious manner, as will be explained more fully in conjunction with the telephone system in which the calling device 10 is incorporated.

Figure 3:
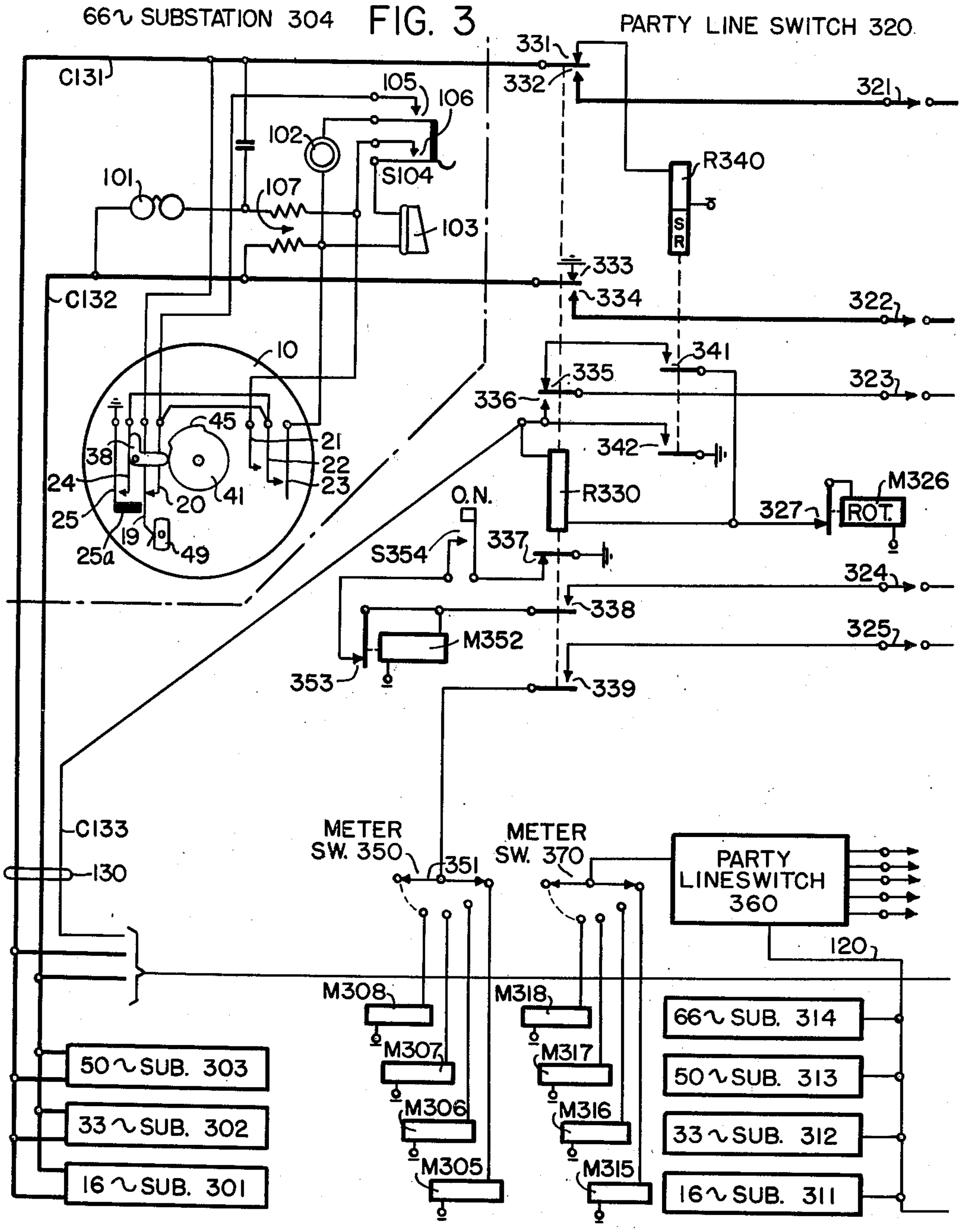
Figure 4:
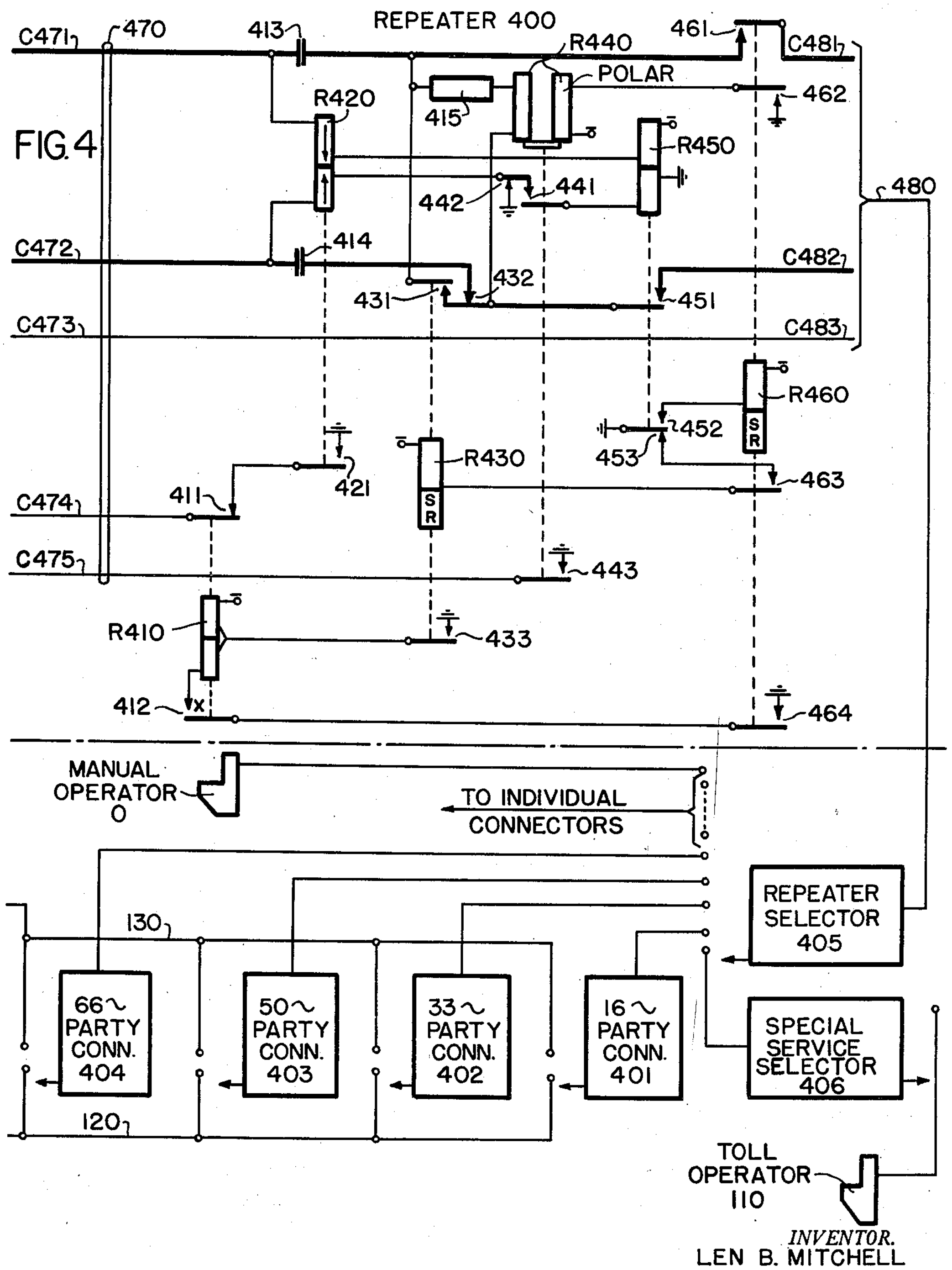

Referring now more particularly to Figs. 3 and 4 of the drawings, the telephone system there illustrated comprises an exchange having a plurality of individual subscriber lines, not shown, terminating thereat, and a plurality of party subscriber lines, including the party subscriber lines 120 and 130, terminating thereat, and provided with switching apparatus. Each of the party subscriber lines has four party subscriber substations individually associated therewith; the party subscriber substations 301, 302, 303 and 304 being individually associated with the party subscriber line 130 and the party subscriber substations 311, 312, 313 and 314 being individually associated with the party subscriber line 120. Each party subscriber substation comprises substation apparatus, including a harmonic ringer, the four harmonic ringers at the four party subscriber substations on each party subscriber line being respectively tuned to 16, 33, 50 and 66 cycle ringing currents. In the present example, the party subscriber substations 301, 302, 303 and 304 connected to the party subscriber line 130 and the party subscriber substations 311, 312, 313 and 314 connected to the party subscriber line 120 are respectively 16, 33, 50 and 66 cycle substations.

Preferably, the substation apparatus provided at each party subscriber substation is substantially identical to that provided at the fourth party subscriber substation 304 connected to the party subscriber line 130, with the exception of certain modifications in the calling devices thereat, as noted more particularly below. The substation apparatus provided at the fourth party subscriber substation 304 comprises a harmonic ringer 101, a transmitter 102, a receiver 103, a hook switch S104, an induction coil 107 and a calling device 10, the calling device 10 being identical to that disclosed in Figs. 1 and 2 of the drawings and including a cam 41 provided with a projection 45 on its periphery. The substation apparatus provided at the first, second and third party subscriber substations 301, 302 and 303, respectively, is substantially identical to that provided at the fourth party subscriber substation 304, except that in the calling devices respectively provided at these party subscriber substations, the cam 41 comprises no projection 45, or a projection 45 of sufficient length to give one, two, or three impulses. In view of the fact that the calling devices provided at the first party subscriber substations 301, 311, etc., each comprise a cam 41 provided with no projection 45 therein, the calling device provided at each first party subscriber substation may be of conventional construction and arrangement and of the character of that disclosed in the previously mentioned Obergfell patent, wherein the cam 41 and the set of cam springs 24 and 25 are eliminated.

The switching apparatus provided in the exchange comprises a plurality of individual line switches of conventional connection and arrangement, not shown, individually associated with the individual subscriber lines, not shown, and a plurality of party line switches, including the party line switches 320 and 360, individually associated with the party subscriber lines, the line switches 320 and 360 being respectively individually associated with the party subscriber lines 130 and 120. Also, this switching apparatus comprises a plurality of meter switches 350, 370, etc., individually associated with the party line switches 320, 360, etc., which are, in turn, individually associated with the party subscriber lines 130, 120, etc. Further, this switching apparatus comprises a group of regular selectors, not shown, a group of repeater selectors, including the repeater selector 405, a group of special service selectors, including the special service selector 406, four groups of individual connectors, not shown, and four groups of party connectors. The first, second, third and fourth groups of party connectors respectively include the party connectors 401, 402, 403 and 404, which party connectors respectively ring a line seized thereby with 16, 33, 50 and 66 cycle ringing currents.

Further, the exchange comprises a manual operator position O, a toll operator position 110 and a plurality of measured service meters individually associated with the party subscriber substations. More particularly, the meters M305, M306, M307 and M308 are respectively individually associated with the party subscriber substations 301, 302, 303 and 304; and the meters M315, M316, M317 and M318 are respectively individually associated with the party subscriber substations 311, 312, 313 and 314. Finally, the exchange comprises a group of repeaters, including the repeater 400.

The apparatus in the exchange is so connected and arranged that each of the individual line switches has access to the group of regular selectors; while each of the party line switches 320, 360, etc., has access to each of the repeaters 400, etc., by way of incoming trunks 470, etc., individual to the repeaters 400, etc. Each repeater 400, etc., in the group is directly connected by way of an outgoing trunk 480, etc., individual thereto to a corresponding one of the repeater selectors 405, etc., in the associated group. Each meter switch is individually associated with one of the party line switches and has access to the four meters respectively individually associated with the four party subscriber substations connected to the party subscriber line with which the party line switch is individually associated. By way of example, it is noted that the meter switch 350 is individually associated with the party line switch 320 and has access to the four meters M305, M306, M307 and M308 respectively individually associated with the four party subscriber substations 301, 302, 303 and 304 connected to the party subscriber line 130 with which the party line switch 320 is individually associated.

Each of the regular selectors in the group and each of the repeater selectors in the group have access to the group of special service selectors, to the four groups of party connectors, to the four groups of individual connectors, and to a group of trunks extending to the manual operator position O. Each of the individual connectors in each of the groups has access to each of the individual subscriber lines; each of the party connectors in each of the groups has access to each of the party subscriber lines; and each of the special service selectors in the group has access to a group of trunks extending to the toll operator position 110.

Preferably, each of the individual line switches is of conventional connection and arrangement; while each of the party line switches is identical to the party line switch 320. The party line switch 320 comprises a switching mechanism, including a rotary wiper set provided with five wipers 321, 322, 323, 324 and 325, an associated contact bank, and a rotary magnet M326 for driving the wiper set noted. Also, the party line switch 320 comprises a relay network including a cutoff relay R330 and a line relay R340.

Preferably, each of the meter switches is identical to the meter switch 350 which comprises a switching mechanism including a rotary wiper set provided with a single double-ended wiper 351, an associated contact bank, and a rotary magnet M352 for driving the wiper set noted. Also, a set of switch springs S354 is associated with the wiper set of the meter switch 350 and operated, in a manner more fully explained hereinafter.

Preferably, each of the repeaters is identical to the repeater 400 which comprises a relay network, including a digit cutoff relay R410, a meter relay R420, a dial relay R430, an answer relay R440, a line relay R450, a hold relay R460 and an impedance element 415.

Preferably, each of the regular selectors and each of the repeater selectors 405, etc., are of the conventional Strowger type; each of the individual connectors and each of the party connectors 401, etc., are of the conventional Strowger type; each of the special service selectors 406, etc., is of the conventional drop-back Strowger type; and the manual operator position O and the toll operator position 110 comprise conventional operator position equipment.

In accordance with the trunking plan incorporated in the telephone system, both the regular selectors and the repeater selectors have access to the group of special service selectors in the first level of the associated contact banks, to the first, second, third and fourth groups of party connectors in the respective second, third, fourth and fifth levels of the associated contact banks, to the four groups of individual connectors in the sixth, seventh, eighth and ninth levels of the associated contact banks, and to the group of trunks extending to the manual operator position O in the tenth level of the associated contact banks.

The connection and arrangement of the system will best be understood from a consideration of the following description, with reference to Figs. 3 and 4 of the drawings, of the operation of the apparatus incorporated therein to set up the different connections between the various individual and party subscriber substations.

Considering now the extension of a call from the fourth party subscriber substation 304, connected to the party subscriber line 130, to the first party subscriber substation 311, connected to the party subscriber line 120, the call is first initiated at the four party subscriber substation 304 by removing the receiver 103 from its associated switchhook, thereby to operate the hook switch S104. When the hook switch S104 is thus operated there is completed, at the contacts 105 and 106 thereof, obvious operative connections between the transmitter 102, the receiver 103 and the party subscriber line 130; whereby a circuit is completed for energizing the winding of the line relay R340 in the party line switch 320 individually associated with the party subscriber line 130. The circuit for energizing the winding of the line relay R340 extends from ground by way of the contacts 333, the line conductor C132 of the party subscriber line 130, the primary winding of the induction coil 107, the transmitter 102, the contacts 105 of the hook switch S104, the impulse springs 19 and 20 of the calling device 10, the line conductor C131 of the party subscriber line 130, the contacts 331 and the winding of R340 to battery.

When thus energized the line relay R340 operates to complete, at the contacts 342, an obvious path for applying ground potential to the control conductor C133 of the party subscriber line 130 in order to mark the party subscriber line 130 as busy to the party connector switches 401, etc., having access thereto. Also, the line relay R340 completes, at the contacts 341, an obvious test connection, including the contacts 335 and 327, between the control wiper 323 of the wiper set and the rotary magnet M326; and completes, at the contacts 342, an obvious ground connection to one terminal of the winding of the cutoff relay R330. At this point it is noted that the party line switch 320 is of the non-homing type, whereby the wiper set thereof engages an associated contact set at each step of the party line switch 320. Accordingly, at this time, the idle or busy condition of the incoming trunk terminated by the engaged contact set and extending to one of the repeaters is tested. In the event the last-mentioned trunk extends to a busy repeater, ground potential appears upon the control conductor thereof and is applied to the control wiper 323 of the wiper set, thereby to complete a path, including the contacts 335, 341 and 342, for short-circuiting the winding of the cutoff relay R330, and to complete a low resistance circuit, including the contacts 335, 341 and 327, for energizing the rotary magnet M326. When the rotary magnet M326 is thus energized it operates, thereby to condition the wiper set to be driven one step in the rotary direction and to interrupt, at the contacts 327, the previously traced circuit for energizing the rotary magnet M326. The rotary magnet M326 then restores, thereby to drive the wiper set one step in the rotary direction and to recomplete, at the contacts 327, the previously mentioned circuit, including the test wiper 323 of the wiper set, for testing the idle or busy condition of the trunk terminated by the contact set engaged by the wiper set at this time. On the other hand, in the event the wiper set engages a contact set terminating an idle trunk, no ground potential appears upon the control conductor thereof, whereby the previously traced test circuit, including the test wiper 323 and the rotary magnet M326, is not completed. Accordingly, the previously traced low resistance circuit for energizing the rotary magnet M326 is not completed and the previously traced path for short-circuiting the winding of the cutoff relay R330 is not completed. Hence, when operation of the party line switch 320 is initiated the wiper set is driven a step in the rotary direction only in the event that it engages a contact set terminating a busy trunk, in which event the wiper set is driven step by step in the rotary direction until it engages a contact set terminating an idle trunk.

Assuming that the wiper set of the party line switch 320 engages the contact set terminating the trunk 470 extending to the repeater 400 and that the latter repeater is idle at this time, no ground potential appears upon the control conductor C473 of the trunk 470. Accordingly, the previously traced low resistance circuit, including the control wiper 323, for energizing the rotary magnet M326 is not completed; and the previously traced path, including the control wiper 323, for short-circuiting the winding of the cutoff relay R330 is not completed. Hence, at this time, an obvious circuit, including the contacts 342 and 327, is completed for energizing in series the winding of the cutoff relay R330 and the rotary magnet M326. When this series circuit is completed the cutoff relay R330 operates; however, the rotary magnet M326 does not operate due to the high series resistance of the winding of the cutoff relay R330.

Upon operating, the cutoff relay R330 interrupts, at the contacts 331 and 333, the previously traced circuit for energizing the winding of the line relay R340, thereby to cause the latter relay to restore shortly thereafter, the line relay R340 being of the slow-to-release type. Also, the cutoff relay R330 completes, at the contacts 332 and 334, a circuit for energizing in series the upper winding of the line relay R450 and the upper and lower windings of the meter relay R420 in the repeater 400, this circuit extending from ground by way of the contacts 442, the lower winding of R420, the line conductor C472 of the trunk 470, the line wiper 322, the contacts 334, the line conductor C132 of the party subscriber line 130, the primary winding of the induction coil 107, the transmitter 102, the contacts 105 of the hook switch S104, the impulse springs 19 and 20 of the calling device 10, the line conductor C131 of the party subscriber line 130, the contacts 332, the line wiper 321, the line conductor C471 of the trunk 470, the upper winding of R420 and the upper winding of R450 to battery. When this series circuit is completed the line relay R450 operates; however, the meter relay R420 does not operate as it is of the differential type.

Further, the cutoff relay R330 interrupts, at the contacts 335, the previously traced test circuit between the control wiper 323 and the rotary magnet M326; and completes, at the contacts 336, an obvious path, including the contacts 342 and the control wiper 323, for applying ground potential to the control conductor C473 of the trunk 470, thereby to mark the trunk 470 as busy to the other party line switches having access thereto. Further, the cutoff relay R330 interrupts, at the contacts 337, a point in a homing circuit traced hereinafter for energizing the rotary magnet M352 of the meter switch 350; prepares, at the contacts 338, a point in an operating circuit traced hereinafter for energizing the rotary magnet M352; and prepares, at the contacts 339, a circuit traced hereinafter for operating the meter M308 individually associated with the fourth party subscriber substation 304 connected to the party subscriber line 130.

Upon operating, the line relay R450 in the repeater 400 completes, at the contacts 452, an obvious circuit for energizing the winding of the hold relay R460, thereby to cause the latter relay to operate. Upon operating, the hold relay R460 completes, at the contacts 461, a loop circuit extending between the repeater 400 and the repeater selector 405 individually associated with the repeater 400. This loop circuit extends from the line conductor C481 of the trunk 480 by way of the contacts 461, the impedance 415, the left-hand winding of the answer relay R440 and the contacts 451 to the line conductor C482 of the trunk 480, the line conductors C481 and C482 of the trunk 480 being connected by way of the apparatus in the repeater selector 405 respectively to battery and ground potentials, whereby the repeater selector 405 is conditioned to be responsive to a digit transmitted thereto. When the repeat selector 405 is thus conditioned to be responsive to a digit transmitted thereto, ground potential therein is applied to the control conductor C483 of the trunk 480; and is returned therefrom by way of the control conductor C473 of the trunk 470 to the control wiper 323. This application of ground potential to the control wiper 323 completes an obvious holding circuit for energizing in series the winding of the cutoff relay R330 and the rotary magnet M326 in the party line switch 320. At this point, it is noted that the above-mentioned holding circuit is completed prior to the restoration of the line relay R340 in order to prevent the release of the party line switch 320. Shortly after the above-mentioned holding circuit is completed the line relay R340 restores in order to interrupt, at the contacts 341, a further point in the previously mentioned test circuit, including the control wiper 323 and the rotary magnet M326; and to interrupt, at the contacts 342, the original operating circuit for energizing in series the winding of the cutoff relay R330 and the rotary magnet M326. Also, it is noted that at this time ground potential appearing upon the control conductor C473 of the trunk 470 is returned by way of the control wiper 323 and the contacts 336 to the control conductor C133 of the party subscriber line 130, thereby to retain the party subscriber line 130 marked as busy to the party connectors 401, etc., having access thereto.

Also, it is noted that when the previously traced loop circuit between the repeater 400 and the repeater selector 405 is completed, the left-hand winding of the answer relay R440 is energized; however, the latter relay does not operate at this time as the right-hand winding thereof is also energized by way of an obvious circuit, including the contacts 462, which was completed incidental to the operation of the hold relay R460. When both the left-hand and the right-hand windings of the answer relay R440 are thus energized this relay does not operate, as it is of the polarized type. Accordingly, at this time an operative connection is completed between the fourth party subscriber substation 304, connected to the party subscriber line 130, and the repeater 400 by way of the party subscriber line 130, the party line switch 320 and the trunk 470; also, the repeater 400 is operatively connected to the repeater selector 405 by way of the trunk 480. Further, dial tone current is returned from the repeater selector 405 by way of the above-traced connection to the receiver 103 at the fourth party subscriber substation 304 in order to indicate to the subscriber thereat that he may proceed to dial the first digit of the directory number.

The subscriber at the calling fourth party subscriber substation 304 then proceeds to dial the first digit of the directory number of the called first party subscriber substation 311, the directory number of the called first party subscriber substation 311 being 2XX, such, for example, as 234. When the subscriber at the calling fourth party subscriber substation 304 pulls the finger wheel of the calling device 10 in accordance with the digit 2, the shunt springs 21, 22 and 23 are operated into engagement; the mechanism housed in the casing of the calling device 10 registers the digit 2; and the cam 41 is rotated in a counterclockwise direction, as viewed in Fig. 3, in order to move the projection 45 carried on the periphery thereof behind the associated pawl 38, in the manner previously explained. When the shunt springs 21, 22 and 23 are operated into engagement, an obvious path is completed for short-circuiting both the transmitter 102 and the receiver 103, in accordance with conventional practice; and a direct dialing bridge, including the primary winding of the induction coil 107, the shunt springs 23 and 22 and the impulse springs 19 and 20, is completed between the line conductors C132 and C131 of the party subscriber line 130.

The subscriber at the calling fourth party subscriber substation 304 then releases the finger wheel of the calling device 10, whereby the calling device 10 operates, in the manner previously explained, in conjunction with Figs. 1 and 2 of the drawings. More particularly, the cam springs 24 and 25 operate to transmit a first ground impulse over the line conductors C131 and C132 of the party subscriber line 130 prior to the operation of the impulse springs 19 and 20 to interrupt the previously traced loop circuit extending between the calling fourth party subscriber substation 304 and the repeater 400, in the manner previously explained. The path for applying ground potential to the line conductor C131 extends from ground by way of the cam springs 25 and 24, the shunt spring 22 and the impulse springs 19 and 20 to the line conductor C131; while the path for applying ground potential to the line conductor C132 extends from ground by way of the cam springs 25 and 24, the shunt springs 22 and 23 and the primary winding of the induction coil 107 to the line conductor C132. The application of ground potential to the line conductor C131 of the party subscriber line 130 completes an alternative circuit substantially identical to that previously traced for energizing in series the upper winding of the meter relay R420 and the upper winding of the line relay R450 in the repeater 400; while the application of ground potential to the line conductor C132 of the party subscriber line 130 completes a path, including the contacts 334, the line wiper 322, the line conductor C472 of the trunk 470 and the contacts 442 for short-circuiting the lower winding of the meter relay R420. Accordingly, the line relay R450 remains in its operative position while the meter relay R420 operates, the latter relay being of the differential type and the lower winding thereof being short-circuited at this time. Upon operating, the meter relay R420 completes, at the contacts 421, a circuit, including the contacts 411, the conductor C474 of the trunk 470, the wiper 324 and the contacts 338, for energizing the magnet M352 of the meter switch 350. When thus energized the magnet M352 operates in order to condition the wiper 351 to be driven one step in the clockwise direction away from its home position.

Upon complete operation of the cam springs 24 and 25 to transmit the first ground impulse, ground potential is removed from the line conductors C131 and C132 of the party subscriber line 130, whereby the previously traced path for short-circuiting the lower winding of the meter relay R420 is interrupted and the previously traced circuit for energizing in series the lower and upper windings of the meter relay R420 and the upper winding of the line relay R450 is recompleted. When both the upper and lower windings of the meter relay R420 are thus energized this relay restores as it is of the differential type, as previously noted; also, at this time the line relay R450 retains its operated position. Upon restoring, the meter relay R420 interrupts, at the contacts 421, the previously traced circuit for energizing the rotary magnet M352, thereby to cause the rotary magnet M352 to restore; whereupon the wiper 351 of the meter switch 350 is driven one step in the clockwise direction away from its home position.

The impulse springs 19 and 20 of the calling device 10 are then operated to transmit the first impulse, whereby the previously mentioned loop circuit extending between the calling fourth party subscriber substation 304 and the repeater 400 is interrupted and then recompleted, in an obvious manner. When the previously mentioned loop circuit is interrupted the series circuit for energizing the lower and upper windings of the meter relay R420 and the upper winding of the line relay R450 is interrupted, thereby to cause the meter relay R420 to retain its restored position and to cause the line relay R450 to restore. Subsequently, when the above-mentioned loop circuit is recompleted the previously traced series circuit for energizing the lower and upper windings of the meter relay R420 and the upper winding of the line relay R450 is recompleted, thereby to cause the meter relay R420 to retain its restored position and to cause the line relay R450 to reoperate. Upon restoring, the line relay R450 interrupts, at the contacts 452, the previously mentioned circuit for energizing the winding of the hold relay R460; however, the latter relay does not restore at this time as it is of the slow-to-release type. Also, the line relay R450 completes, at the contacts 453, an obvious circuit, including the contacts 463, for energizing the winding of the dial relay R430, thereby to cause the latter relay to operate. Upon operating, the dial relay R430 completes, at the contacts 431, an obvious path for short-circuiting the impedance element 415 and the left-hand winding of the answer relay R440, thereby to provide a low resistance bridge across the line conductors C481 and C482 of the trunk 480 and positively to prevent operation of the answer relay R440 incidental to switching surges impressed upon the trunk 480 incidental to operation of the repeater selector 405. Also, the dial relay R430 completes, at the contacts 433, an obvious circuit for energizing the upper winding of the digit cutoff relay R410. When the upper winding of the digit cutoff relay R410 is thus energized this relay takes a first step in order to complete, at the contacts 412, an obvious path for short-circuiting the lower winding thereof. When the lower winding of the digit cutoff relay R410 is thus short-circuited it will not take a second step to interrupt, at the contacts 411, a prepared point in the previously traced circuit for energizing the rotary magnet M352 of the meter switch 350. Also, upon restoring, the line relay R450 interrupts, at the contacts 451, the previously traced loop circuit extending between the repeater 400 and the repeater selector 405.

Upon reoperating, the line relay R450 recompletes, at the contacts 451, the previously mentioned loop circuit extending between the repeater 400 and the repeater selector 405, recompletes, at the contacts 452, the previously mentioned circuit for energizing the winding of the hold relay R460, and interrupts, at the contacts 453, the previously traced circuit for energizing the winding of the dial relay R430; however, the dial relay R430 does not immediately restore as it is of the slow-to-release type. At this point, it is noted that neither the hold relay R460 nor the dial relay R430 restores during impulsing; both of these relays being of the slow-to-release type, as previously noted. The first restoration and reoperation of the line relay R450 is effective to transmit an impulse over the trunk 480 to the repeater selector 405, thereby to cause the repeater selector 405 to take one step in the vertical direction, in an obvious manner.

During the subsequent operation of the calling device 10 the cam springs 24 and 25 operate to transmit their second ground impulse; then the impulse springs 19 and 20 operate to transmit their second impulse; and, finally, the cam springs 24 and 25 operate to transmit their third ground impulse; at which time the finger wheel of the calling device 10 is returned to its normal position and the first digit 2 has been transmitted therefrom. The second and third ground impulses transmitted by the cam springs 24 and 25 of the calling device 10 cause the meter relay R420 to operate and then restore two additional times; whereby the meter relay R420 is operated and then restored three times incidental to the operation of the calling device 10 to transmit the digit 2, in the manner explained above. This operation of the meter relay R420 causes the wiper 351 of the meter switch 350 to be advanced three steps away from its normal position in the clockwise direction, in the manner explained above. The second impulse transmitted by the impulse springs 19 and 20 of the calling device 10 causes the line relay R450 to restore and reoperate one additional time; whereby the line relay R450 is restored and then reoperated twice incidental to the operation of the calling device 10 to transmit the digit 2, in the manner explained above. This operation of the line relay R450 causes the digit 2 to be transmitted over the trunk 480 to the repeater selector 405, in the manner explained above.

The repeater selector 405 responds to the first digit 2 transmitted thereto to advance its wiper set two steps in the vertical direction; whereupon the wiper set thereof is operated automatically in the rotary direction to select an idle party connector in the group, including the party connector 401, in an obvious manner. Assuming that the party connector 401 is seized by the repeater selector 405, the party connector 401 is then conditioned to be responsive to the second and third digits 3 and 4, respectively, in accordance with conventional practice.

At the conclusion of the first digit 2, the line relay R450 reoperates, thereby to interrupt, at the contacts 453, the previously traced circuit for energizing the winding of the dial relay R430, whereupon the latter relay restores shortly thereafter as no further restoration of the line relay R450 occurs until the subscriber at the calling fourth party subscriber substation 304 dials the second digit 3. Upon restoring, the dial relay R430 interrupts, at the contacts 433, the previously traced path for short-circuiting the lower winding of the digit cutoff relay R410, whereby an obvious circuit, including the contacts 464 and 412, is completed for energizing in series the upper and lower windings of the digit cutoff relay R410. When the above-traced circuit for energizing in series the upper and lower windings of the digit cutoff relay R410 is completed, this relay takes a second step or operates fully, thereby to interrupt, at the contacts 411, a further point in the previously traced circuit for energizing the rotary magnet M352.

At this time, the wiper 351 of the meter switch 350 has been operated three steps in the clockwise direction away from its normal position, thereby to prepare a circuit traced hereinafter for operating the meter M308 individually associated with the fourth party subscriber substation 304 connected to the party subscriber line 130.

The subscriber at the calling party subscriber substation 304 then proceeds to dial the second digit 3, thereby to cause the line relay R450 to restore and reoperate three times in order to transmit the three impulses of the second digit over the trunk 480 and the repeater selector 405 to the party connector 401. Incidental to the dialing of the second digit 3, the calling device 10 operates, in the manner explained above, in connection with the dialing of the first digit 2, whereby the meter relay R420 operates and restores three times. However, this operation of the meter relay R420, incidental to the dialing of the second digit 3, is without effect due to the fact that the digit cutoff relay R410 occupies its fully operated position at this time, as the last-mentioned relay was fully operated at the conclusion of the first digit 2 incidental to the restoration of the dial relay R430, in the manner previously explained. Finally, the subscriber at the calling party subscriber substation 304 proceeds to dial the third digit 4, thereby to cause the line relay R450 to restore and reoperate four times in order to transmit the four impulses of the third digit over the trunk 480 and the repeater selector 405 to the party connector 401. Also, incidental to the dialing of the third digit 4, the meter relay R420 operates and restores three times; however, this operation of the meter relay R420 is without effect due to the fully operated position of the digit cutoff relay R410. In view of the foregoing explanation of the operation of the meter relay R420, incidental to the dialing of the second and third digits, it will be understood that this relay is effective to control the setting of the meter switch 350 only incidental to the dialing of the first digit of the directory number, due to the full operation of the digit cutoff relay R410 at the conclusion of the first digit of the directory number.

The party connector 401 responds to the second digit 3 and the third digit 4 in accordance with conventional practice in order to seize the party subscriber line 120. Upon seizing the party subscriber line 120, the party connector 401 tests the idle or busy condition thereof; whereupon busy tone current is returned over the repeater selector 405, the trunk 480, the repeater 400, the trunk 470, the party line switch 320 and the party subscriber line 130 to the calling fourth party subscriber substation 304 in the event the called party subscriber line 120 is busy at this time. On the other hand, in the event the called party subscriber line 120 is idle at this time, the party connector 401 operates in order to return ring-back tone current over the previously traced connection to the calling fourth party subscriber substation 304 connected to the party subscriber line 130; and to project 16 cycle ringing current over the called party subscriber line 120. The 16 cycle ringing current projected over the called party subscriber line 120 causes operation of only the harmonic ringer at the called first party subscriber substation 311 connected to the party subscriber line 120 due to the fact that the harmonic ringers disposed at the second, third and fourth subscriber substations 312, 313 and 314, respectively, connected to the party subscriber line 120, are respectively tuned to ringing currents having the respective frequencies of 33, 50 and 66 cycles.

The subscriber at the called first party subscriber substation 311, connected to the party subscriber line 120, answers the call by removing the receiver of the telephone instrument thereat from its associated switchhook, thereby to complete an obvious operative connection, including the party subscriber line 120, between the first party subscriber substation 311 and the party connector 401. When this connection is completed the party connector 401 operates in order to reverse battery over the repeater selector 405 and the loop circuit extending between the repeater selector 405 and the repeater 400. When battery is thus reversed over the above-mentioned loop circuit the left-hand winding of the answer relay R440 is energized in the opposite direction, in an obvious manner, whereupon the answer relay R440 operates. Upon operating, the answer relay R440 interrupts, at the contacts 442, the previously traced circuit for energizing in series the lower and upper windings of the meter relay R420 and the upper winding of the line relay R450; and completes, at the contacts 441, an obvious alternative loop circuit for energizing in series the upper and lower windings of the meter relay R420 and the upper and lower windings of the line relay R450, whereby the loop circuit extending between the fourth party subscriber substation 304, connected to the party subscriber line 130, and the repeater 400 is balanced in order to improve the transmission qualities thereof. Finally, the answer relay R440, upon operating, completes, at the contacts 443, a circuit including the conductor C475 of the trunk 470, the wiper 325 of the party line switch 320, the contacts 339 and the wiper 351 and engaged fourth contact in the associated contact bank of the meter switch 350 for operating the meter M308 individually associated with the fourth party subscriber substation 304, connected to the party subscriber line 130 in order to register the completion of a call from the last-mentioned party subscriber substation.

At this time, the previously traced loop circuit extending between the calling fourth party subscriber substation 304, connected to the party subscriber line 130, and the repeater 400 is completed; the previously traced loop circuit extending between the repeater 400 and the party connector 401 is completed; and the previously mentioned connection extending between the called first party subscriber substation 311, connected to the party subscriber line 120, and the party connector 401 is completed. Finally, it is noted that an operative connection between the trunk 470 incoming to the repeater 400, and the trunk 480 out-going from the repeater 400, is completed by way of the condensers 413 and 414. Hence, an established connection is completed between the calling fourth party subscriber substation 304, connected to the party subscriber line 130, and the called first party subscriber substation 311, connected to the party subscriber line 120, for two-way communication purposes.

The release of the established connection between the calling fourth party subscriber substation 304, connected to the party subscriber line 130, and the called first party subscriber substation 311, connected to the party subscriber line 120, is primarily under the control of the subscriber at the calling fourth party subscriber substation 304, and is accomplished when the subscriber thereat replaces the receiver 103 upon its associated switchhook, thereby to operate the hook switch S104. When the hook switch S104 is thus operated the transmitter 102 and the receiver 103 are effectively disconnected from the party subscriber line 130 and the previously traced loop circuit extending to the repeater 400 is interrupted, at the contacts 105 of the hook switch S104, thereby to cause the line relay R450 in the repeater 400 to restore. Upon restoring, the line relay R450 interrupts, at the contacts 452, the previously mentioned circuit for energizing the winding of the hold relay R460, thereby to cause the latter relay to restore shortly thereafter. Also, the line relay R450 interrupts, at the contacts 451, the previously traced loop circuit extending between the repeater 400 and the repeater selector 405, and the previously mentioned circuit for energizing the left-hand winding of the answer relay R440. When the previously mentioned loop circuit extending between the repeater 400 and the repeater selector 405 is thus interrupted, the answer relay R440 in the repeater 400 restores and the repeater selector 405 is released in order to effect the release of the party connector 401. When the repeater selector 405 is thus released the application of ground potential is removed from the control conductor C483 of the trunk 480, thereby to interrupt the previously traced holding circuit for energizing in series the winding of the cutoff relay R330 and the rotary magnet M236 in the party line switch 320, in order to cause the latter relay to restore.

Upon restoring, the hold relay R460 interrupts, at the contacts 464, the previously traced circuit for energizing in series the upper and lower windings of the digit cutoff relay R410, thereby to cause the latter relay to restore. Also, upon restoring, the answer relay R440 interrupts, at the contacts 443, the previously traced circuit for energizing the meter M308 individually associated with the fourth party subscriber substation 304, connected to the party subscriber line 130. At this time the repeater 400 is completely released and is marked as idle to the party line switches having access thereto by the absence of potential upon the control conductor C473 of the trunk 470.

Upon restoring, the cutoff relay R330 in the party line switch 320 interrupts, at the contacts 336, a further point in the previously traced circuit for energizing in series the winding of the cutoff relay R330 and the rotary magnet M326, and completes, at the contacts 337, an obvious circuit including the set of switch springs S354 and the contacts 353 for energizing the rotary magnet M352. At this point it is noted that the set of switch springs S354 is actuated into engagement when the wiper 351 of the meter switch 350 is rotated in the clockwise direction away from its home position. When thus energized the rotary magnet M352 operates to interrupt, at the contacts 353, the previously traced circuit for energizing the rotary magnet M352, and to condition the wiper 351 to be driven an additional step in the clockwise direction. When the previously traced circuit for energizing the rotary magnet M352 is interrupted the latter magnet restores, thereby to recomplete, at the contacts 353, the circuit for energizing the rotary magnet M352 and to drive the wiper 351 one step in the clockwise direction away from its home position. In view of the foregoing explanation of the mode of operation of the rotary magnet M352, it will be understood that it is intermittently energized, thereby to drive the wiper 351 of the meter switch 350 step by step in the clockwise direction back into its home position. When the wiper 351 of the meter switch 350 is driven back into its home position the set of switch springs S354 is actuated into disengagement, thereby to interrupt a further point in the previously traced circuit for energizing the rotary magnet M352 in order positively to arrest further operation thereof. At this time the meter switch 350 is completely released and restored to its normal position and the party line switch 320 is completely released. It is again noted that the wiper set of the party line switch 320 remains in engagement with the contact set terminating the trunk 470 extending to the repeater 400, as the party line switch 320 is of the non-homing type.

Also, when ground potential is removed from the control conductor C473 of the trunk 470, the application of ground potential to the control conductor C133 of the party subscriber line 130 is interrupted, thereby to mark the last-mentioned party subscriber line as idle to the party connectors 401, etc., having access thereto. Also, at this time, the party subscriber line 120 is marked as idle to the party connectors 401, etc., having access thereto, assuming that the subscriber at the called party subscriber substation 311 has replaced the receiver of the telephone instrument thereat upon its associated switchhook. Hence, the established connection between the calling fourth party subscriber substation 304, connected to the party subscriber line 130, and the called first party subscriber substation 311, connected to the party subscriber line 120, is completely released at this time.

In view of the foregoing explanation of the mode of operation of the apparatus incorporated in the telephone system to extend a connection from the calling fourth party subscriber substation 304, connected to the party subscriber line 130, to the called first party subscriber substation 311, connected to the party subscriber line 120, it will be understood that a call may be extended therefrom to the called second, third or fourth party subscriber substations 312, 313 or 314, respectively, connected to the party subscriber line 120, in a substantially identical manner by dialing the appropriate directory number. As will be apparent from the trunking plan, the directory numbers of the second, third and fourth party subscriber substations 312, 313 and 314, respectively, connected to the party subscriber line 120 are 3XX, 4XX and 5XX or 334, 434, and 534, respectively, in accordance with the foregoing example. The party connectors 401, 402, 403 and 404 respectively respond to the digits 1, 2, 3 and 4, in accordance with the foregoing example, to seize the party subscriber line 120 and respectively ring the seized party subscriber line 120 with ringing currents of the following frequencies: 16 cycle, 33 cycle, 50 cycle and 66 cycle. The ringing currents of the respective frequencies mentioned projected over the called party subscriber line 120 operate the harmonic ringers at the respective first, second, third and fourth party subscriber substations 311, 312, 313 and 314, connected to the party subscriber line 120.

Also, it will be understood that a call may be extended from the first, second or third party subscriber substations 301, 302 or 303, respectively, connected to the party subscriber line 130, to any one of the party subscriber substations 311, etc., connected to the party subscriber line 120, in a manner substantially identical to that explained above. However, in the above-mentioned cases, when the calling devices at the respective first, second and third party subscriber substations 301, 302 and 303, respectively, connected to the party subscriber line 130 are operated, no ground impulses, one ground impulse and two ground impulses are respectively transmitted therefrom in order to cause the corresponding operations of the meter switch 350, whereby the meters M305, M306 and M307 respectively corresponding to the first, second and third party subscriber substations 301, 302 and 303, respectively, are operated in order to register the initiation of a call from the corresponding party subscriber substation.

Further, it will be understood that the extension of a call from one of the party subscriber substations, connected to a party subscriber line, to an individual subscriber substation, connected to an individual subscriber line, is substantially the same as that described above, whereby the appropriate meter is controlled in the manner previously explained; the above-mentioned connection is extended by way of one of the individual connectors. Also, it will be understood that the extension of a connection from an individual subscriber substation, connected to an individual subscriber line, to one of the party subscriber substations, connected to a party subscriber line, is substantially the same as that described above, whereby no metering is effected; the above-mentioned connection is extended by way of the appropriate one of the party connectors 401, etc. Finally, it is noted that the extension of a call from an individual subscriber substation, connected to an individual subscriber line, to an individual subscriber substation, connected to an individual subscriber line, is in accordance with conventional practice, whereby no metering is effected; the above-mentioned connection is extended by way of one of the individual connectors.

Considering the extension of a call from a party subscriber substation, connected to a party subscriber line, such, for example, as the fourth party subscriber substation 304, connected to the party subscriber line 130, to the manual operator position O, it is pointed out that the initiation and extension of the call from the calling fourth party subscriber substation 304 by way of the party line switch 320, the trunk 470, the repeater 400 and the trunk 480 to the repeater selector 405, are the same as that previously explained. At this time the subscriber at the calling fourth party subscriber substation 304 dials the single digit 0, whereby the repeater selector 405 operates in order to seize an idle one of the trunks in the group extending to the manual operator position O. The operator at the manual operator position O answers the call in accordance with conventional practice, whereby an established connection is completed between the calling fourth party subscriber substation 304, connected to the party subscriber line 130, and the called manual operator position O. In connection with the extension of the above-mentioned call, it is noted that the operation of the meter relay R420 in the repeater 400 and the meter switch 350, incidental to the operation of the calling device 10 at the fourth party subscriber substation 304 to transmit the digit 0, is the same as that previously explained. However, it is pointed out that the above-traced connection does not include a connector. Accordingly, when the operator at the manual operator position O answers the call, battery potential is not reversed over the trunk 480 to the repeater 400. Hence, the answer relay R440 in the repeater 400 does not operate in order to effect operation of the meter M308 individually associated with the calling fourth party subscriber substation 304, connected to the party subscriber line 130, in view of the fact that the above-mentioned call is a free call which is not metered. Thus it will be understood that, although the meter switch 350 is set to select the meter M308 incidental to the dialing of the digit 0 upon the calling device 10 at the calling fourth party subscriber substation 304 to extend the above-mentioned call to the manual operator position O, in the manner previously explained, the meter M308 is not operated to meter the call when the operator at the manual operator position O answers the call.

Considering now the extension of a call from a party subscriber substation, connected to a party subscriber line, such, for example, as the fourth party subscriber substation 304, connected to the party subscriber line 130, to the toll operator position 110, it is pointed out that the initiation and extension of the call from the calling fourth party subscriber substation 304 by way of the party line switch 320, the trunk 470, the repeater 400 and the trunk 480 to the repeater selector 405, are the same as that previously explained. At this time the subscriber at the calling fourth party subscriber substation 304 dials the directory number 110, whereby the repeater selector 405 responds to the first digit 1 to select an idle special service selector, such, for example, as the special service selector 406. The special service selector 406 responds to the second digit 1 and drops back in a manner well understood, and then responds to the third digit 0 to select an idle trunk to the toll operator position 110. The operator at the toll operator position 110 answers the call in accordance with conventional practice, whereby an established connection is completed between the calling fourth party subscriber substation 304, connected to the party subscriber line 130, and the called toll operator position 110. In connection with the extension of the above-mentioned call, it is noted that the operation of the meter relay R420 in the repeater 400 and the meter switch 350, incidental to the operation of the calling device 10 at the fourth party subscriber substation 304 to transmit the first digit 1, is the same as that previously explained. However, it is pointed out that the above-traced connection does not include a connector. Accordingly, when the operator at the toll operator position 110 answers the call, battery potential is not reversed over the trunk 480 to the repeater 400. Hence, the answer relay R440 in the repeater 400 does not operate in order to effect operation of the meter M307 individually associated with the calling third party subscriber substation 303, connected to the party subscriber line 130, in view of the fact that the above-mentioned call is a free call which is not metered. Thus it will be understood that, although the meter switch 350 is set to select the meter M307 incidental to the dialing of the first digit 1 upon the calling device 10 at the calling fourth party subscriber substation 304 to extend the above-mentioned call to the toll operator position 110, in the manner previously explained, the meter M307 is not operated to meter the call when the operator at the toll operator position 110 answers the call.

In connection with the extension of the above-mentioned call, it is noted that incidental to the operation of the calling device 10 at the calling fourth party subscriber substation 304, connected to the party subscriber line 130, to transmit the first digit 1 to the line relay R450 in the repeater 400, this calling device 10 also sends two ground impulses to the meter relay R420 in the repeater 400, thereby to cause the meter switch 350 to select the meter M307 individually associated with the third party subscriber substation 303 instead of the meter M308 individually associated with the calling fourth party subscriber substation 304 as previously noted. However, the selection of the improper meter M307 by the meter switch 350 in connection with the extension of the above-mentioned call is immaterial as the meter M307 is not operated, as explained above.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In a calling device, a dial having a normal position and being variably rotatable away therefrom to a plurality of other positions, an arbor operatively connected to said dial, means for returning said dial back to its normal position after it has been rotated, a first cam operated through a gear train from said arbor only during the return of said dial, the rotation of said first cam depending upon the extent of the rotation of said dial, a first impulse sender comprising two springs and having one spring engageable by said first cam, a second impulse sender comprising two springs, a link between said one spring of said first impulse sender and one of the springs of said second impulse sender causing said spring of said second impulse sender to directly follow the operation of said one spring engaged by said first cam, and a second cam operated by said arbor engageable with the other spring of said second impulse sender to advance said other spring into contact position, whereby said operating spring of the second impulse sender engages the advanced spring thereof to send a fixed number of impulses regardless of said other positions to which said dial has been operated.

2. In a calling device, a dial having a normal position and being variably rotatable away therefrom, an arbor operatively connected to said dial, means for returning said dial back to its normal position after it has been rotated, a first impulse sender, a first cam operated by said arbor only during the return of said dial, said first impulse sender operated by said first cam to send a variable number of impulses depending upon the extent of the rotation of said dial, a second impulse sender, linkage means between said impulse senders, said linkage means operated by said first impulse sender to directly operate said second impulse sender, and a second cam mounted on said arbor and operable during the return of said dial to render said linkage means effective or ineffective to operate said second impulse sender whereby said second impulse sender makes contact after and breaks contact before said first impulse sender, said second impulse sender making a fixed number of contacts regardless of the number of contacts made by said first impulse sender.

3. In a calling device, a dial having a normal position and being variably rotatable therefrom, an arbor operatively connected to said dial, means for returning said dial back to its normal position after it has been rotated, a first set of impulse springs, a first cam, means including a gear train operated from said arbor during the return of said dial for rotating said first cam, the extent of the rotation of said first cam depending upon the rotation of said dial, said first cam engaging one of said first set of impulse springs, a second set of impulse springs, a link between the cam engaging spring of said first set of impulse springs and one of said second set of impulse springs thereby causing said one spring of said second set of impulse springs to follow the movement of said first cam engaged spring, and means including a pawl and a second cam mechanism disposed between said arbor and said second set of impulse springs and operated during the return of said dial for advancing the other of said second set of impulse springs into contact position whereby said linked spring of said second set of impulse springs makes contact with the advanced spring thereof after and breaks contact before said first impulse springs during the time that the other of said second set of impulse springs is advanced by said second cam.

4. In a calling device, a dial having a normal position and being variably rotatable away therefrom, an arbor operatively connected to said dial, means for returning said dial back to its normal position after it has been rotated, a first set of impulse springs, a first cam, means including a gear train operated from said arbor during the return of said dial for rotating said first cam, the extent of the rotation of said first cam depending upon the extent of the rotation of said dial, a second set of impulse springs, a link between one spring of said first set and one spring of said second set of impulse springs, said first cam operating said linked spring of said first set of impulse springs which in turn causes the operation of said other linked spring, a second cam operable to advance the other of said second set of impulse springs into a position where it can contact its linked spring when said linked spring is operated by said linked spring of said first set of impulse springs so that said second set of impulse springs can make and break contact only during the time said first set of impulse springs can make and break contact, the number of impulses sent by said second set of impulse springs depending upon the extent of advancement of said other of said second set of impulse springs by said second cam.

LEN B. MITCHELL.

REFERENCES CITED

The following references are of record in the file of this patent:

UNITED STATES PATENTS

| Number | Name | Date |
|---|---|---|
| 1,969,926 | Eichoff | Aug. 14, 1934 |
| 2,043,674 | Obergfell | June 9, 1936 |
| 2,320,401 | Beizer | June 1, 1943 |
| 2,366,647 | Ostline | Jan. 2, 1945 |